(12) United States Patent
Schindewolf et al.

(10) Patent No.: US 11,849,026 B2
(45) Date of Patent: Dec. 19, 2023

(54) DATABASE INTEGRATION WITH AN EXTERNAL KEY MANAGEMENT SYSTEM

(71) Applicant: SAP SE, Walldorf (DE)

(72) Inventors: Martin Schindewolf, Walldorf (DE); Meinolf Block, Heidelberg (DE); Christoph Hohner, Schwetzingen (DE); Sascha Zorn, Neulussheim (DE)

(73) Assignee: SAP SE, Walldorf (DE)

( * ) Notice: Subject to any disclaimer, the term of this patent is extended or adjusted under 35 U.S.C. 154(b) by 275 days.

(21) Appl. No.: 17/228,986

(22) Filed: Apr. 13, 2021

(65) Prior Publication Data
US 2022/0329413 A1 Oct. 13, 2022

(51) Int. Cl.
*H04L 9/08* (2006.01)
*G06F 21/62* (2013.01)
*H04L 9/14* (2006.01)

(52) U.S. Cl.
CPC ........ *H04L 9/0822* (2013.01); *G06F 21/6218* (2013.01); *H04L 9/14* (2013.01)

(58) Field of Classification Search
CPC ....... H04L 9/0822; H04L 9/14; H04L 9/0825; H04L 9/0891; G06F 21/6218; G06F 21/602
See application file for complete search history.

(56) References Cited

U.S. PATENT DOCUMENTS

| | | | |
|---|---|---|---|
| 7,434,203 B2 | 10/2008 | Block et al. | |
| 8,352,427 B2 | 1/2013 | Mohr et al. | |
| 9,124,575 B2 | 9/2015 | Friedmann et al. | |
| 10,142,100 B2 | 11/2018 | Block et al. | |
| 10,235,531 B2 | 3/2019 | Block et al. | |
| 10,409,801 B2* | 9/2019 | Foebel | H04L 67/02 |
| 10,505,729 B2 | 12/2019 | Block et al. | |
| 10,515,077 B2* | 12/2019 | Kaushik | G06F 21/602 |

(Continued)

OTHER PUBLICATIONS

Wikipedia.org [online], "Cryptographic key types" created on Oct. 2005, [retrieved on Mar. 31, 2021], retrieved from: URL <https://en.wikipedia.org/wiki/Cryptographic_key_types#Key_types>, 4 pages.

(Continued)

*Primary Examiner* — Abiy Getachew
(74) *Attorney, Agent, or Firm* — Fish & Richardson P.C.

(57) ABSTRACT

The present disclosure involves systems, software, and computer implemented methods for database integration with an external key management system. One example method includes receiving, by a database system, a key encryption key from an external key management system external to the database system that is used to encrypt a data encryption key used to encrypt database data. The data encryption key is obtained, by the database system, using the key encryption key. Encrypted database data is decrypted, by the database system and using the data encryption key, to obtain decrypted database data before performing an operation on the decrypted database data. The database system determines that the external key management system has performed an operation on the key encryption key. In response to determining that the external key management system has performed the operation on the key encryption key, the database system modifies operation of the database system.

17 Claims, 4 Drawing Sheets

(56) References Cited

U.S. PATENT DOCUMENTS

2018/0013549 A1\* 1/2018 Block .................. H04L 9/3247
2020/0341951 A1\* 10/2020 Oberhofer ............. G06F 16/254

OTHER PUBLICATIONS

Wikipedia.org [online], "Key server (cryptographic)" created on Apr. 2004, [retrieved on Mar. 31, 2021], retrieved from: URL <https://en.wikipedia.org/wiki/Key_server_(cryptographic)>, 5 pages.

\* cited by examiner

DATABASE INTEGRATION WITH AN EXTERNAL KEY MANAGEMENT SYSTEM

TECHNICAL FIELD

The present disclosure relates to computer-implemented methods, software, and systems for database integration with an external key management system.

BACKGROUND

An organization may be required, for regulatory reasons, to comply with various data protection and data privacy laws. For example, regulations may require that personal information be accessible only by authorized individuals.

SUMMARY

The present disclosure involves systems, software, and computer implemented methods for database integration with an external key management system. An example method includes: receiving, by a database system, a key encryption key from an external key management system external to the database system, wherein the key encryption key is used to encrypt a data encryption key used to encrypt database data stored by the database system; obtaining, by the database system, the data encryption key using the key encryption key; decrypting, by the database system and using the data encryption key, encrypted database data to obtain decrypted database data before performing an operation on the decrypted database data; determining, by the database system, that the external key management system has performed an operation on the key encryption key; and in response to determining that the external key management system has performed the operation on the key encryption key, modifying, by the database system, operation of the database system.

Implementations may include one or more of the following features. The database system can determine that the external key management system has performed the operation on the key encryption key in response to periodic querying of the external key management system for changes to the key encryption key. The operation on the key encryption key can include a new version of the key encryption key or updated properties of the key encryption key and modifying the operation of the database system can include updating the key encryption key to reflect the new version or the updated properties. The operation on the key encryption key can include a disabling of the key encryption key and modifying the operation of the database system can include disabling the database system by denying access to the key encryption key. The encrypted database data can be stored and managed by a database tenant. The data encryption key can be managed by a local secure storage tenant of the database system that is separate from the database tenant. The database tenant can request and receive the data encryption key from the local secure storage tenant. The local secure storage tenant can use the key encryption key to access the data encryption key. The local secure storage tenant can request the key encryption key from the external key management service. The local secure storage tenant can run as a technical database system user that is authorized to request the key encryption key from the external key management system but is not authorized to access the encrypted database data. The local secure storage tenant can determine that the external key management system has performed the operation on the key encryption key. The local secure storage tenant can determine that the external key management system has disabled the key encryption key. The local secure storage tenant can deny a request from the database tenant for the data encryption key after determining that the external key management system has disabled the key encryption key. A first user of the external key management system can be authorized to initiate the operation on the key encryption key but not authorized to access the encrypted database data.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
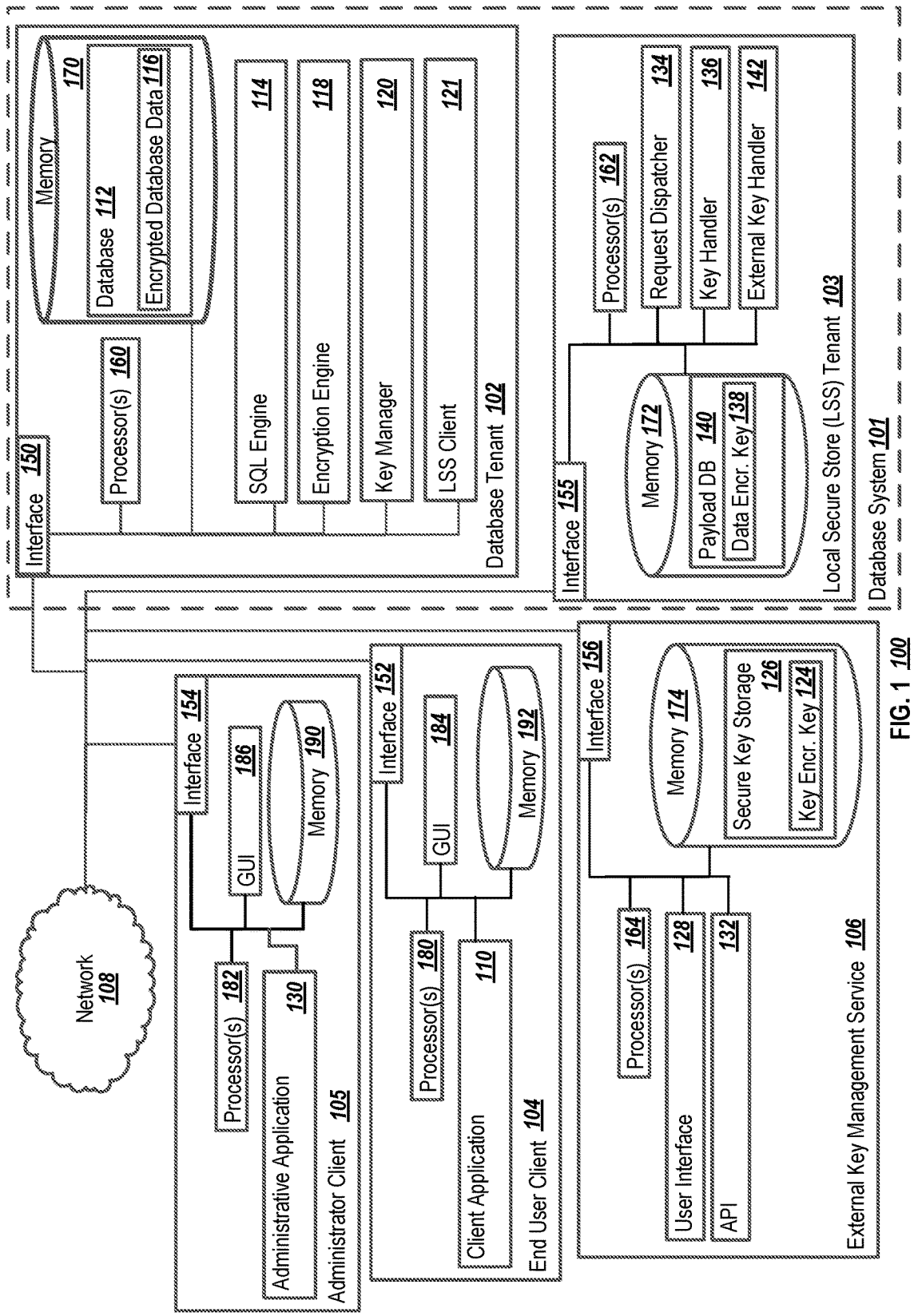
FIG. 1 is a block diagram illustrating an example system for database integration with an external key management system.

An organization can use a database system to store information. The organization may desire, for regulatory and/or other security requirements or preferences, that data stored in the database system not be accessible to anyone except authorized users of or associated with the organization. Accordingly, database data can be protected using encryption keys that can be included in a keychain. However, the organization may also want to restrict who has access to the encryption keys. In prior systems, key management may be performed internally in the database system itself. However, an organization may have concerns that a database operator, such as an operator not employed by the organization, may have access to the encryption keys and thereby be a possible vector for unauthorized access to the encrypted secure data. Customers may find it undesirable or unacceptable that one actor has access to both the encrypted database data and the corresponding encryption keys to decrypt the encrypted database data.

Accordingly, an external KMS (Key Management System) (and in some cases, a local secure storage (LSS)) can be used to alleviate such customer concerns. For example, at least some encryption keys can be stored in and managed by an external KMS that is external to the database system. An administrative user of the organization can access a user interface of the external KMS to manage encryption keys used by the database system for the organization. For example, the administrative user of the organization can use the external KMS user interface to request various operations on encryption keys managed by the external KMS, such as rotating a key, changing properties of a key, or revoking a key. Encryption keys can include key encryption keys used to encrypt an encryption key. In some cases, the external KMS is used to manage key encryption keys (and may or may not be used to manage data encryption keys used to encrypt customer data).

If the customer's administrative user requests a revocation of a key (e.g., a key encryption key) using the user interface of the external KMS, the external KMS can revoke the key, which can include sending a key revocation message to a local secure storage (LSS) that is included in, interfaces with, or otherwise communicates with the database system. The LSS can respond to the key revocation message by configuring the key encryption key as revoked in the LSS. After the key encryption key has been configured as revoked in the LSS, the database system can no longer use the LSS to obtain keys for encrypting or decrypting database data. The LSS can immediately react to requests from the external KMS and, for example, can adaptively configure the LSS so that a failure code is returned to the database system in response to a next key request from the database system.

Accordingly, customer key operations performed using the external KMS can have a desired effect on the database system itself. For example, the customer may wish to disable the database system by revoking a key encryption key. Once the key has been revoked using the external KMS, a net effect can be that the database system can no longer obtain an encryption key from the LSS, which can effectively disable the database system until a new encryption key is configured. Having the database system automatically respond to external key management operations performed using the external KMS provides a technical advantage while separating duties among database operator and customer users. Other technical advantages include the use of the external KMS with the database system as part of an implementation of a segregation-of-duties security principle in which encryption key administrators associated with a customer perform key related management using the external KMS as separate activities from database administrators who may use the database system with respect to encrypted data stored in the database system. Segregating duties can reduce the risk of fraud and tampering.

FIG. 1 is a block diagram illustrating an example system 100 for database integration with an external key management system. Specifically, the illustrated system 100 includes or is communicably coupled with a database system 101 (that includes a database tenant 102 and a LSS tenant 103), an end-user client device 104, an administrator client device 105, an external KMS 106, and a network 108. Although shown separately, in some implementations, functionality of two or more systems or servers may be provided by a single system or server. In some implementations, the functionality of one illustrated system, server, or component may be provided by multiple systems, servers, or components, respectively.

A client application 110 running on the end-user client device 104 can submit a query to the database system 101 to retrieve, add, or change data stored in a database 112. The database 112 can be a tenant-specific database managed by the database tenant 102. The database system 101 can have other database tenants other than the database tenant 102. A SQL engine 114 servicing the database tenant 102 can receive the query from the client application 110.

The database 112 can include encrypted database data 116. An encryption engine 118 can be configured to encrypt and decrypt database data upon insertion into or retrieval from the database 112, respectively. The encryption engine 118 can use a data encryption key to encrypt/decrypt the encrypted database data 116. The encryption engine 118 can obtain data encryption key(s) from a key manager 120. Data encryption keys can be used for data volume encryption (e.g., to encrypt the encrypted database data 116), redo log encryption, and encryption of backups.

Although the key manager 120 can manage and store data encryption keys directly, to provide segregation of duties as described herein, the key manager 120 can obtain a data encryption key from the LSS tenant 103 using a LSS client 121. The LSS tenant 103 can provide a requested data encryption key to the key manager 120, as described in more detail below. To provide further security, a data encryption key can itself be encrypted using a key encryption key.

To provide further security and further segregation of duties, key encryption keys can be managed by and obtained from the external KMS 106. The external KMS 106 can be used by the database system 101 and possibly by other systems or applications. The external KMS 106 is a highly-secure, tamper-proof system for generating, distributing, and managing cryptographic keys for devices and applications.

Users or organizations may desire, need, or choose to use the external KMS 106 as an independent key management system to manage master keys and other components as a part of a compliance requirement and/or security preference. The external KMS 106 can store key encryption keys 124 in a secure key storage 126 that is managed by a tamper-proof hardware security module, for example. As described in more detail below, use of the external KMS 106 with the database system 101 can fulfill a customer compliance or security requirement for having customer-controlled key management services. A customer can use the administrator client 105 to access a user interface 128 of the external KMS 106 to create and manage key encryption keys used with the database system 101. The user interface 128 can be displayed in or as an administrative application 130, for example.

While customer administrators associated with the database tenant 102 can access the user interface 128 to manage key encryption keys, database operators of the database system 101 can be prevented from accessing the user interface 128 or the external KMS 106. The external KMS 106 can therefore provide assurance on data protection and privacy in that a provider or operator of the database system 101 does not have access to customer key encryption keys. The external KMS 106 provides appropriate segregation of duties, with key encryption keys managed outside of the environment of the database system 101. The external KMS 106 can provide key chain hierarchies, role-based access, authentication and authorization, and other security features.

The external KMS 106 can provide an API 132 that can be used to securely retrieve key encryption keys 124 from the external KMS 106. In some cases, an authorized process of the database tenant 102, such as the key manager 120, can access the external KMS using the API 132. However, as part of implementation of segregation of duties, the LSS tenant 103, rather than the database tenant 102, can interface with the external KMS 106, as part of servicing a request from the LSS client 121.

For example, a request dispatcher 134 can receive a request for a data encryption key from the LSS client 121. The request dispatcher 134 can determine that the request is for a data encryption key and can forward the request to a key handler 136. The requested data encryption key can be stored as a data encryption key 138 at the LSS tenant 103 in a payload database 140. At least a portion of the payload database 140 can be encrypted with a key encryption key managed by the external KMS 106. The key handler 136 can request that an external key handler 142 send a message to the external KMS 106 to request the key encryption key.

If the external KMS 106 determines that the key encryption key is enabled, the external KMS 106 can provide the requested key encryption key to the LSS tenant 103. The LSS tenant 103 can use the key encryption key to decrypt the portion(s) of the payload database 140 that are encrypted using the key encryption key to obtain the data encryption key 138. The LSS tenant 103 can provide the requested data encryption key to the LSS client 121, and the database tenant 102 can use the data encryption key for database operation(s), such as servicing a request from the client application 110.

If the external KMS 106 determines that the requested key encryption key is not enabled, the external KMS 106 can send a failure response to the external key handler 142. In response to being notified that the key encryption key is disabled, the LSS tenant 103 can inform the LSS client 121 that the requested data encryption key is not accessible. The requested key encryption key may be disabled in the external KMS 106 due to a customer action using the user interface 128. The customer may wish to effectively disable the database tenant 102, for example. Such instances may occur if a potential breach is identified or suspected, as well as in any other circumstance. As another example, the requested key encryption key may be enabled in the external KMS 106 but may have a different version or different properties from a last-used key encryption key. The LSS tenant 103 can receive and use a new-version or adjusted-properties key encryption key, as appropriate.

The database system 101, either from the LSS tenant 103 or the database tenant 102, can periodically query (e.g., poll) the external KMS 106 to determine whether any changes have occurred to key(s) managed by the external KMS 106 that are relevant to the database system 101. For example, the external KMS 106 can inform the database system 101, in response to a query, that a key encryption key has been disabled, replaced, or modified (e.g., with respect to changed properties). Accordingly, the database system 101 can respond appropriately to a change to a key managed by the external KMS 106. For example, if the database system 101 determines that a key encryption key managed by the external KMS 106 has been disabled, the database system 101 can modify operation of the database system 101 (which can include, for example, preventing use of the key encryption key, which can prevent use of a corresponding data encryption key, which may effectively make the encrypted database data 116 inaccessible). As such, the database system 101 can be configured to proactively respond to customer-initiated actions performed using the external KMS 106. The polling from the database system 101 to the external KMS 106 can result in an upper bound on an amount of time before a customer-triggered action in the external KMS is detected by the database system 101 to enable the database system 101 to appropriately respond in a timely manner to the customer action. The upper bound can result in the database system 101 responding more quickly to the customer action at the external KMS than might occur if the database system 101 waits to access the external KMS in response to a user request.

Although the database system 101 has been described as querying the external KMS 106 for changes to key(s) managed by the external KMS 106, one or more specific components, such as the LSS tenant 103 and/or the database tenant 102, can periodically query the external KMS 106. In some implementations, the LSS tenant 103 and/or the database tenant 102 includes a command line utility that can be used to check that the external KMS 106 is reachable and that a key can be retrieved. Command-line utilities can be used for automatically polling, for example, and/or can be used by an administrator.

As used in the present disclosure, the term "computer" is intended to encompass any suitable processing device. For example, although FIG. 1 illustrates a single database tenant 102, a single end-user client device 104, a single administrator client device 105, and a single external KMS 106, the system 100 can be implemented using two or more database tenants 102, two or more LSS tenants 103, two or more external key management systems, or multiple client devices. Indeed, the database system 101 may be comprised of any combination of computer or processing devices such as, for example, a blade server, general-purpose personal computer (PC), Mac®, workstation, UNIX-based workstation, or any other suitable devices. In other words, the present disclosure contemplates computers other than general purpose computers, as well as computers without conventional operating systems. Further, the database tenant 102, the external KMS 106, and the client devices 104 and 105 may be adapted to execute any operating system, including Linux, UNIX, Windows, Mac OS®, Java™, Android™, iOS or any other suitable operating system. According to one implementation, the database system 101 may also include or be communicably coupled with an e-mail server, a Web server, a caching server, a streaming data server, and/or other suitable server.

Interfaces 150, 152, 154, 155, and 156 are used by the database tenant 102, the end-user client device 104, the administrator client device 105, the LSS tenant 103, and the external KMS 106, respectively, for communicating with other systems in a distributed environment—including within the system 100—connected to the network 108. Generally, the interfaces 150, 152, 154, 155, and 156 each comprise logic encoded in software and/or hardware in a suitable combination and operable to communicate with the network 108. More specifically, the interfaces 150, 152, 154, 155, and 156 may each comprise software supporting one or more communication protocols associated with communications such that the network 108 or interface's hardware is operable to communicate physical signals within and outside of the illustrated system 100.

The database tenant 102, the LSS tenant 103, and the external KMS 106 each respectively include one or more processors 160, 162, or 164. Each processor in the processors 160, 162, or 164 may be a central processing unit (CPU), a blade, an application specific integrated circuit (ASIC), a field-programmable gate array (FPGA), or another suitable component. Generally, each processor in the processors 160, 162, or 164 executes instructions and manipulates data to perform the operations of the respective system.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Python, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The database tenant 102, the LSS tenant 103, and the external KMS 106 each respectively include memory 170, 172, or 174. In some implementations, the one or more of the database tenant 102, the LSS tenant 103, or the external KMS 106 includes multiple memories. Each memory 170, 172, or 174 may include any type of memory or database module and may take the form of volatile and/or non-volatile memory including, without limitation, magnetic media, optical media, random access memory (RAM), read-only memory (ROM), removable media, or any other suitable local or remote memory component. Each memory 170, 172, or 174 may store various objects or data, including caches, classes, frameworks, applications, backup data, business objects, jobs, web pages, web page templates, database tables, database queries, repositories storing business and/or dynamic information, encryption keys, and any other appropriate information including any parameters, variables, algorithms, instructions, rules, constraints, or references thereto associated with the purposes of the respective computing device.

The end-user client device 104 and the administrator client device 105 may each generally be any computing device operable to connect to or communicate with the database system 101 or the external KMS 106, respectively, via the network 108 using a wireline or wireless connection. In general, the end-user client device 104 and the administrator client device 105 each comprise an electronic computer device operable to receive, transmit, process, and store any appropriate data associated with the system 100 of FIG. 1. The end-user client device 104 and the administrator client device 105 can each include one or more client applications, including the client application 110 or the administrative application 130, respectively. A client application is any type of application that allows the end-user client device 104 or the administrator client device 105 to request and view content on a respective client device. In some implementations, a client application can use parameters, metadata, and other information received at launch to access a particular set of data from the database system 101 or the external KMS 106. In some instances, a client application may be an agent or client-side version of the one or more enterprise applications running on an enterprise server (not shown).

The end-user client device 104 and the administrator client device 105 respectively include processor(s) 180 or processor(s) 182. Each processor 180 or 182 included in the end-user client device 104 or the administrator client device 105 may be a central processing unit (CPU), an application specific integrated circuit (ASIC), a field-programmable gate array (FPGA), or another suitable component. Generally, each processor 180 or 182 included in the end-user client device 104 or the administrator client device 105 executes instructions and manipulates data to perform the operations of the end-user client device 104 or the administrator client device 105, respectively. Specifically, each processor 180 or 182 included in the end-user client device 104 or the administrator client device 105 executes the functionality required to send requests to the database system 101 or the external KMS 106 and to receive and process responses from the database system 101 or the external KMS 106.

The end-user client device 104 and the administrator client device 105 are each generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the respective client device, including digital data, visual information, or the GUI 184 or a GUI 186, respectively.

The GUIs 184 and 186 interface with at least a portion of the system 100 for any suitable purpose, including generating a visual representation of the client application 110 or the administrative application 130, respectively. In particular, the GUI 184 and/or the GUI 186 may be used to view and navigate various Web pages. Generally, the GUI 184 and the GUI 186 provide a respective user with an efficient and user-friendly presentation of business data provided by or communicated within the system 100. The GUI 184 and the GUI 186 may each comprise a plurality of customizable frames or views having interactive fields, pull-down lists, and buttons operated by the user. The GUI 184 and the GUI 186 each contemplate any suitable graphical user interface, such as a combination of a generic web browser, intelligent engine, and command line interface (CLI) that processes information and efficiently presents the results to the user visually.

Memory 190 and memory 192 included in the end-user client device 104 or the administrator client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memory 190 and the memory 192 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104 and/or administrator client devices 105 associated with, or external to, the system 100. For example, while the illustrated system 100 includes one end-user client device 104, alternative implementations of the system 100 may include multiple end-user client devices 104 communicably coupled to the network 108, or any other number suitable to the purposes of the system 100. Additionally, there may also be one or more additional end-user client devices 104 external to the illustrated portion of system 100 that are capable of interacting with the system 100 via the network 108. Further, the term "client", "client device" and "user" may be used interchangeably as appropriate without departing from the scope of this disclosure. Moreover, while the end-user client device 104 and the administrator client device 105 may be described in terms of being used by a single user, this disclosure contemplates that many users may use one computer, or that one user may use multiple computers.

Figure 2:
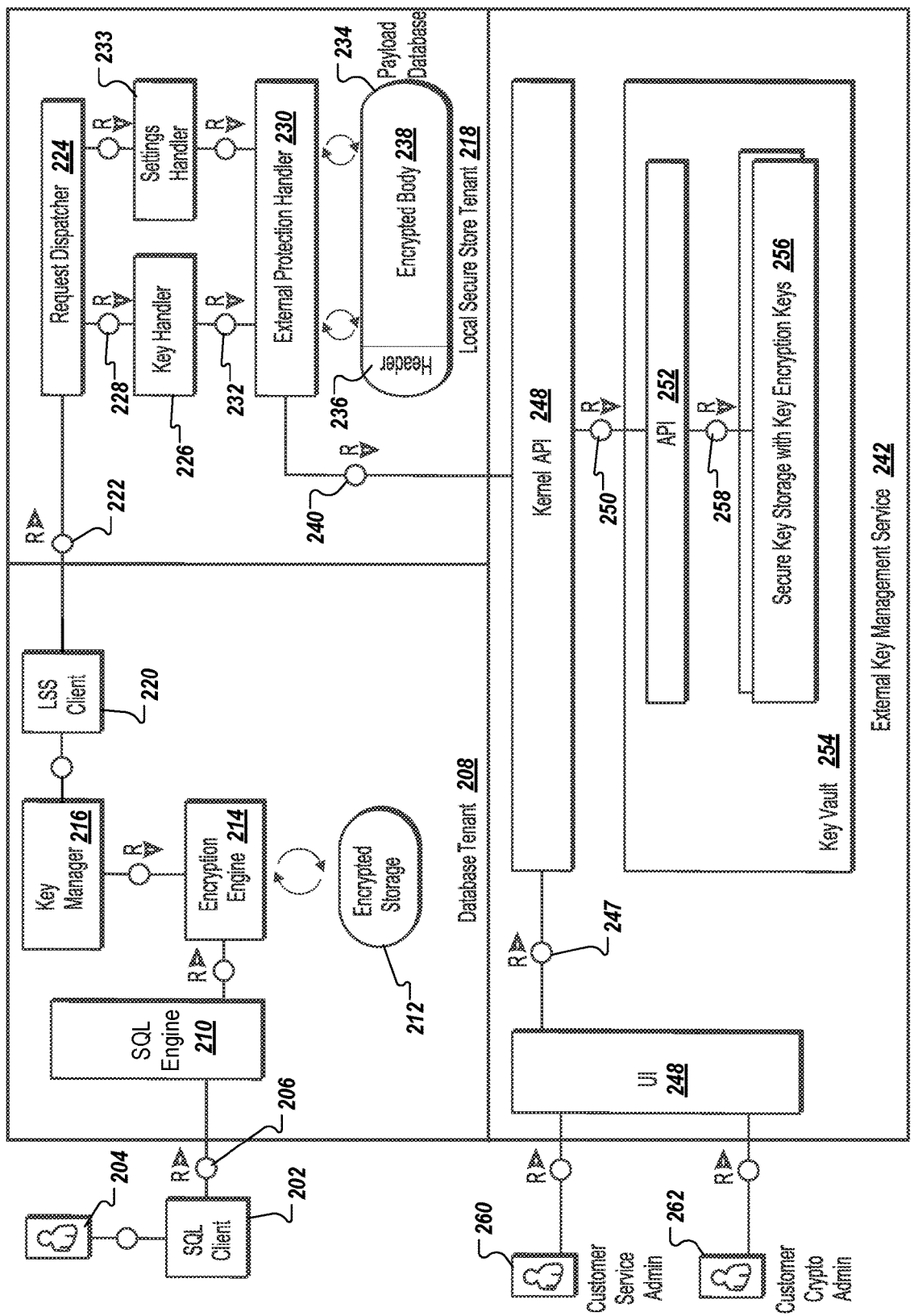
FIG. 2 is a block diagram illustrating an example system for database integration with an external key management system.

FIG. 2 is a block diagram illustrating an example system 200 for database integration with an external key management system. A SQL (Structured Query Language) client 202 running on behalf of a user 204 can submit a client request 206 to a database tenant 208. The client request 206 may correspond to a request to add, retrieve, edit, or delete data stored by the database tenant 208. A SQL engine 210 can receive and process the client request 206. Data stored by the database tenant 208 can be encrypted and stored in encrypted storage 212. As part of adding, editing, deleting, or modifying data in response to the client request 206, the SQL engine 210 can use an encryption engine 214 to decrypt data retrieved from the encrypted storage 212 or encrypt data to be added to the encrypted storage 212. The encryption engine 214 can perform encryption and decryption operations using data encryption keys obtained from a key manager 216.

Rather than being stored in the database tenant 208, the data encryption keys can be stored in a LSS tenant 218. The LSS tenant 218 is separate from the database tenant 208 and is a lightweight utility and/or service for storing and securely managing encryption keys, data encryption keys, and other security settings that are used for the database tenant 208. Storing the encryption keys, data encryption keys, and other security settings (e.g., passwords, other encryption configuration information) in the LSS tenant 218 helps protect such data from illegitimate or fraudulent usage, as described in more detail below.

The key manager 216 can use a LSS client 220 to communicate with the LSS tenant 218. For example, the key manager 216 can use the LSS client 220 to establish a secure communication channel with the LSS tenant 218 and use the secure communication channel to send a data encryption key request 222 to the LSS tenant 218 for a data encryption key to be used by the encryption engine 214. The data encryption key request 222 can be received by a request dispatcher 224 of the LSS tenant 218. The request dispatcher 224 can receive data encryption key requests and settings requests. If the request dispatcher 224 receives a settings request (e.g., for security-relevant configuration settings), the request dispatcher 224 can forward the settings request to a settings handler 233.

The request dispatcher 224 can verify the data encryption key request 222 using a whitelisting approach, to ensure that the sender of the request (e.g., the database tenant 208, or more specifically, the key manager 216 using the LSS client 220) is an authorized requester. The request dispatcher 224 can be configured to reject (or in some cases ignore) unauthorized requests. The request dispatcher 224 can forward the data encryption key request 222 to a key handler 226 as a forwarded data encryption key request 228. Similarly, the key handler 226 can forward the forwarded data encryption key request 228 to an external protection handler 230, as a data encryption key request 232.

As described in more detail below, the external protection handler 230 can, in response to the data encryption key request 232, retrieve a requested data encryption key from a payload database 234. The retrieved data encryption key can be returned to the key handler 226 and then on to the request dispatcher 224. The request dispatcher 224 can return the retrieved data encryption key to the database tenant 208 in response to the data encryption key request 222. The data encryption key can then be used by the encryption engine 214 as part of servicing the client request 206.

The database tenant 208 does not permanently store the data encryption key. Rather, data encryption keys are obtained by the database tenant 208 from the LSS tenant 218 as needed. For instance, if the database tenant 208 is restarted, the database tenant 208 requests data encryption keys from the LSS tenant 218. The LSS tenant 218 can return the requested data encryption key as plain text. Although the LSS tenant 218 could be configured to receive encryption requests to encrypt database data and to return encrypted database data, for performance reasons, encryption is instead performed in the database tenant 208, using a key received from the LSS tenant 218.

Advantages of storing encryption keys and other information in the LSS tenant 218 (rather than the database tenant 208) include benefits obtained from applying a segregation-of-duties security principle. Applying the segregation-of-duties security principle can include dividing critical functions among different security personnel and database processes to ensure that no one individual or process has enough information or access privilege to perpetrate damaging fraud. For example, use of the LSS tenant 218 can separate database operator users who can access database data from a technical user who can access the keys.

For instance, different operating system user roles can be defined on a database server (or server system) on which the database tenant 208 and the LSS tenant 218 execute. A system administrator user (e.g., <sid>adm) can be defined for providing access to uncritical files and encrypted customer data stored in the database tenant 208. A technical encryption key administrator user (e.g., <sid>crypt) can be defined for accessing and managing encryption keys. The LSS tenant 218 can run under the technical encryption key administrator operating system user (<sid>crypt) as a service on the database server that is a separate service from the database tenant 208. The system administrator user <sid>adm can access the encrypted customer data but cannot directly access encryption keys. In contract, the technical encryption key administrator user sid<crypt> can access the encryption keys but not the encrypted data. As described above, the LSS tenant 218 can be configured to only provide an encryption key to a whitelisted requester, such as the key manager 216 which is directly involved in servicing a client application request received by the SQL engine 210.

The payload database 234 can include a header 236 and an encrypted body 238. The encrypted body 238 can include encrypted information such as data encryption keys, passwords, or encryption configuration information used for the database tenant 208. The header 236 can include a payload encryption key that can be used to decrypt the encrypted body 238 of the payload database 234. The header 236 can also be encrypted. The external protection handler 230 of the LSS tenant 218 can be configured to send a request 240 to an external KMS 242 to obtain a header encryption key from the external KMS 242 that can be used to decrypt the contents of the header 236. The external protection handler 230 can receive the header encryption key from the external KMS 242 in response to the request 240. In some implementations, the header 236 has been encrypted using a public key of an asymmetric key pair and the header encryption key received from the external KMS 242 is a private key of the asymmetric key pair that can be used to decrypt the header 236. The external protection handler 230 can use the received header encryption key to decrypt the header 236 to obtain the payload database encryption key. The external protection handler 230 can use the payload database encryption key to decrypt the encrypted body 238 to obtain the data encryption key requested by the database tenant 208.

The response to the request 240 can include information about changes to a requested key that have been initiated by a user of the external KMS 242 using a user interface (UI) 246 of the external KMS 242. The UI 246 can be used by customer administrative users to perform various activities related to key management, for example.

For instance, the UI 246 can be used to initially create, or create a new version of, the header encryption key. The header encryption key can be referred to as a key encryption key or a wrapping key, and is used to encrypt and decrypt another key. The UI 246 can send a message 247 to a kernel API 248 of the external KMS 242 in response to a key management request received from a user using the UI 246. When the message 247 corresponds to a request to create a header encryption key the kernel API 248 can send a message 250 using an API 252 of a key vault 254 of the external KMS, requesting creation of a header encryption key in a secure key storage 256. The key vault 254 can create the requested header encryption key in the secure key storage 256 (as illustrated by a message 258). For example, when the header encryption key is implemented using an asymmetric key pair, the key vault 254 can create the public key and the private key of the key pair and store the public key and the private key in the secure key storage 256. The kernel API 248 and key vault 254 can respond to user-initiated key management requests, including performing any modifications to key(s) stored in the secure key storage 256.

The UI 246 can be used for other lifecycle activities that may occur with respect to key management, such as activation, backup, deletion, revocation, rotation, or changing properties of a key. Changing properties of a key can include changing a padding scheme, for example. The UI 246 can be used by customer users having different roles with respect to the external KMS 242. For example, a customer can define different roles and different user accounts that are each assigned one or more roles. For example, a customer service administrator user 260 may be assigned a first role that enables the customer service administrator user 260 to see which systems have keys managed by the external KMS 242. In contrast, a customer crypto administrator user 262 may be assigned a second role that allows more privileged access, such as creation of new versions of a key, rotating a key, or disabling a key. The customer can configure roles and accounts so that only customer users are given access to the external KMS 242 (e.g., database operator users of the database tenant 208 can be prevented from accessing the external KMS).

The kernel API 248 can include, for example in a response to the request 240, information regarding a customer-initiated operation corresponding to the header encryption key. The external protection handler 230 can respond to the information regarding the customer-initiated operation, based on the type of operation. For example, the external protection handler 230 can update a header encryption key with a new version of the header encryption key included in the response if the response indicates that the customer has created a new version of the header encryption key. Similarly, the external protection handler 230 can update a header encryption key with different properties if the response indicates that the customer has modified properties of the header encryption key.

As another example, when the response indicates that the customer has disabled the header encryption key, the LSS tenant 218 can record an indication of the disabling of the header encryption key, and will no longer use the header encryption key unless the LSS tenant 218 receives an indication from the external KMS that the header encryption key has been re-enabled. Not using the header encryption key can include denying a data encryption key request received from the database tenant 208.

The external protection handler 230 can be configured to periodically query the external KMS 242 for the header encryption key, and monitor responses from the external KMS 242, to determine whether the customer has disabled or otherwise changed the header encryption key. Periodically querying the external KMS 242 can result in the LSS tenant 218 learning of a key disablement or key change, thus enabling the LSS tenant 218 to be reconfigured in response to the key disablement or key change, to respond appropriately to a next data encryption key request from the database tenant 208 (e.g., to deny a next data encryption key request from the database tenant 208).

Although the system 200 has been described as the LSS tenant 218 receiving information about changes to key(s) managed by the external KMS 242, in some implementations, the database tenant 208 can be configured to receive information about changes to keys, or to receive a requested key, from the external KMS 242, without using the LSS tenant 218. The database tenant 208 can query the external KMS 242 for changes to keys managed by the external KMS 242, for example.

Figure 3:
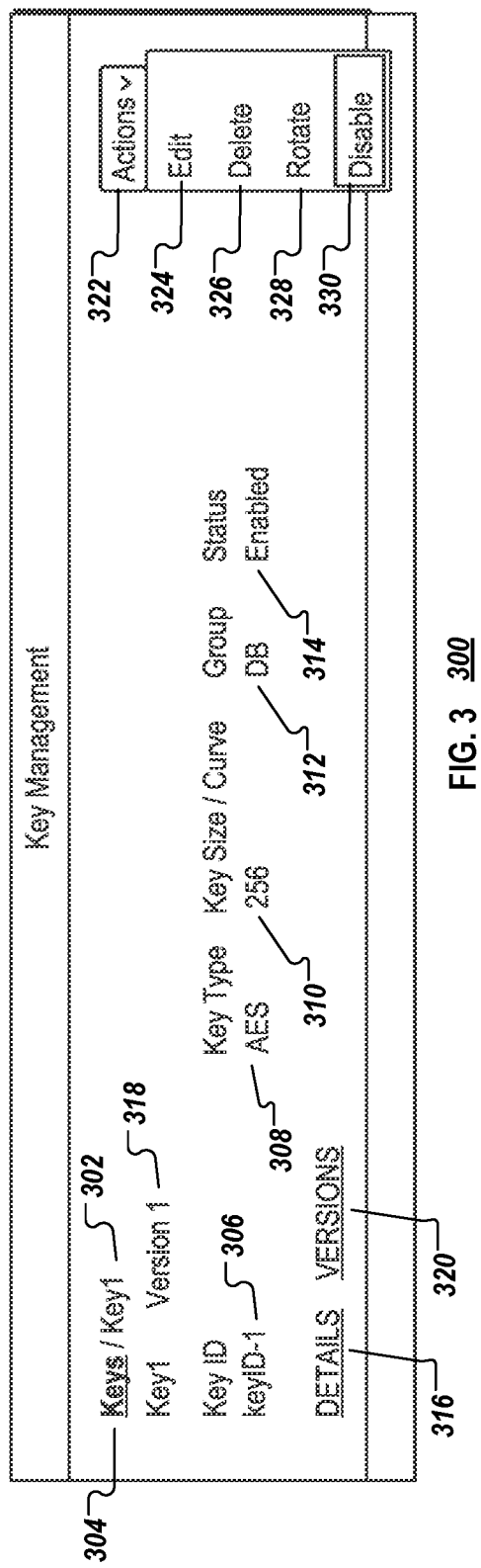
FIG. 3 is an example user interface for an external key management system.

FIG. 3 is an example user interface 300 for an external key management system. The user interface 300 can be used by a customer to manage keys used by a database system such as the database system 101 of FIG. 1, for example. The user interface 300 displays information for "Key1" key 302. The customer can select a keys link 304 to view information for other keys that may be managed for the customer by the external KMS. The user interface 300 displays various properties of the key 302, such as a key id (e.g., key value) 306, a key type 308 (e.g., AES (Advanced Encryption Standard)), a key size 310 (e.g., 256 bytes), a key group 312 (e.g., that can be used to organize keys), and a key status 314 (e.g., enabled, as shown, or disabled). Other information about the key 302 can be displayed in response to selection of a details link 316. The key 302 is at a first version 318. If multiple versions of the key 302 exist, information for other versions can be displayed in response to selection of a versions link 320.

The user interface 300 includes an action menu 322 that enables a customer to trigger an action on the key 302. As described above, a customer-triggered action on a key managed by the external KMS can be detected by the database system 101 (e.g., by the LSS tenant 103) and the database system 101 can respond accordingly to the customer-triggered action. The action menu 322 includes edit 324, delete 326, rotate 328, and disable 330 menu items, enabling the customer to edit, delete, rotate, or disable the key 302, respectively.

Figure 4:
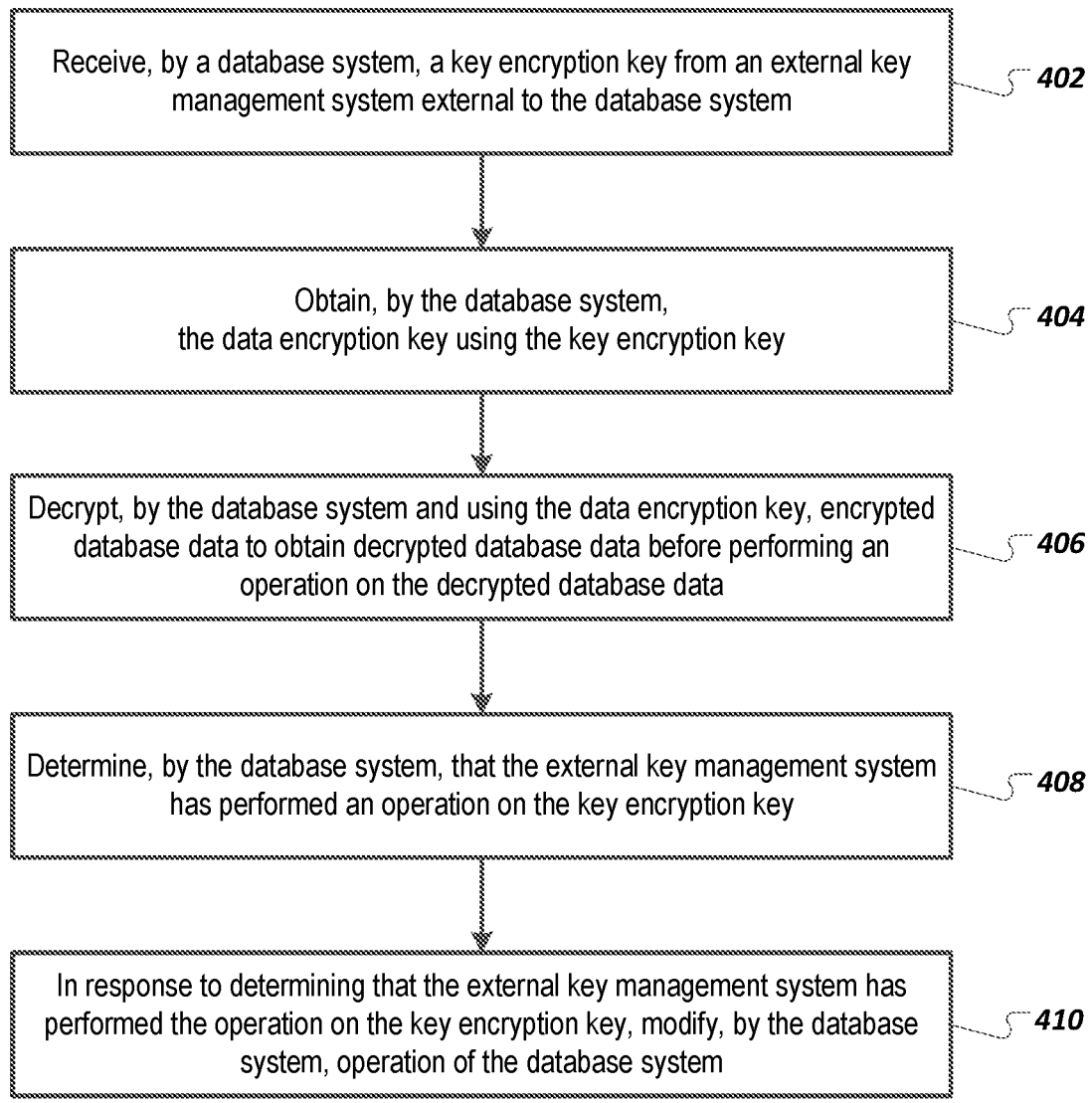
FIG. 4 is a flowchart of an example method for database integration with an external key management system.

FIG. 4 is a flowchart of an example method 400 for database integration with an external key management system. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the database system 101 of FIG. 1.

At 402, a key encryption key is received by a database system from an external key management system external to the database system. The key encryption key encrypts a data encryption key used to encrypt database data stored by the database system.

At 404, the data encryption key is obtained by the database system using the key encryption key. The database system can use the key encryption key to decrypt an encrypted data encryption key, to obtain the data encryption key. The encrypted database data can be stored and managed by a database tenant. The data encryption key can be managed by a local secure storage tenant of the database system that is separate from the database tenant. The database tenant can request and receive the data encryption key from the local secure storage tenant. The local secure storage tenant can use the key encryption key to access the data encryption key. The local secure storage tenant requests the key encryption key from the external key management service. The local secure storage tenant can run as a technical database system user that is authorized to request the key encryption key from the external key management system but is not authorized to access the encrypted database data.

At 406, the database system decrypts encrypted database data using the data encryption key to obtain decrypted database data before performing an operation on the decrypted database data.

At 408, the database system determines that the external key management system has performed an operation on the key encryption key. The database system can determine that the external key management system has performed the operation on the key encryption key in response to periodic querying of the external key management system for changes to the key encryption key. The operation on the key encryption key can include creation of a new version of the key encryption key, updating of properties of the key encryption key, or disabling of the key encryption key. The local secure storage tenant can determine that the external key management system has performed the operation on the key encryption key.

At 410, the database system modifies operation of the database system in response to determining that the external key management system has performed the operation on the key encryption key. Modifying the operation of the database system can include updating the key encryption key to reflect the new version or the updated properties. When the operation on the key encryption key is disabling of the key encryption key, modifying the operation of the database system can include disabling the database system by denying access to the key encryption key. The local secure storage tenant determines that the external key management system has disabled the key encryption key and the local secure storage tenant can deny a request from the database tenant for the data encryption key after determining that the external key management system has disabled the key encryption key.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
    sending, by a local secure storage tenant of a database system, a request to an external key management system external to the database system for a header encryption key, where the header encryption key is used to encrypt a header of a payload database that includes a key encryption key that is used to encrypt and decrypt a data encryption key used by a database tenant of the database system, wherein the database tenant is separate from the local secure storage tenant;
    receiving, by the local secure storage tenant, the header encryption key from the external key management system;
    using, by the local secure storage tenant, the header encryption key to decrypt the header of the payload database to obtain the key encryption key;
    receiving a request at the local secure storage tenant, from the database tenant, for the data encryption key;
    obtaining, by the local secure storage tenant, the data encryption key using the key encryption key;
    providing, by the local secure storage tenant, the data encryption key to the database tenant;
    decrypting, by the database tenant and using the data encryption key, encrypted database data to obtain decrypted database data before performing an operation on the decrypted database data;
    determining, by the local secure storage tenant, that the external key management system has performed an operation on the header encryption key; and
    in response to determining that the external key management system has performed the operation on the header encryption key, modifying, by the local secure storage tenant, operation of the database system.

2. The computer-implemented method of claim 1, wherein the database system determines that the external key management system has performed the operation on the header encryption key in response to periodic querying of the external key management system for changes to the header encryption key.

3. The computer-implemented method of claim 1, wherein the operation on the header encryption key comprises a new version of the header encryption key or updated properties of the header encryption key and modifying the operation of the database system comprises updating the header encryption key to reflect the new version or the updated properties.

4. The computer-implemented method of claim 1, wherein the operation on the header encryption key comprises a disabling of the header encryption key and modifying the operation of the database system comprises disabling the database system by denying access, to the database tenant, to the key encryption key.

5. The computer-implemented method of claim 1, wherein the local secure storage tenant requests the header encryption key from the external key management system.

6. The computer-implemented method of claim 5, wherein the local secure storage tenant runs as a technical database system user that is authorized to request the header encryption key from the external key management system but is not authorized to access the encrypted database data.

7. The computer-implemented method of claim 1, wherein the local secure storage tenant determines that the external key management system has performed the operation on the header encryption key.

8. The computer-implemented method of claim 7, wherein:
the local secure storage tenant determines that the external key management system has disabled the header encryption key; and
the local secure storage tenant denies a request from the database tenant for the data encryption key after determining that the external key management system has disabled the header encryption key.

9. The computer-implemented method of claim 1, wherein a first user of the external key management system is authorized to initiate the operation on the header encryption key but is not authorized to access the encrypted database data.

10. A system comprising:
one or more computers; and
a computer-readable medium coupled to the one or more computers having instructions stored thereon which, when executed by the one or more computers, cause the one or more computers to perform operations comprising:
sending, by a local secure storage tenant of a database system, a request to an external key management system external to the database system for a header encryption key, where the header encryption key is used to encrypt a header of a payload database that includes a key encryption key that is used to encrypt and decrypt a data encryption key used by a database tenant of the database system, wherein the database tenant is separate from the local secure storage tenant;
receiving, by the local secure storage tenant, the header encryption key from the external key management system;
using, by the local secure storage tenant, the header encryption key to decrypt the header of the payload database to obtain the key encryption key;
receiving a request at the local secure storage tenant, from the database tenant, for the data encryption key;
obtaining, by the local secure storage tenant, the data encryption key using the key encryption key;
providing, by the local secure storage tenant, the data encryption key to the database tenant;
decrypting, by the database tenant and using the data encryption key, encrypted database data to obtain decrypted database data before performing an operation on the decrypted database data;
determining, by the local secure storage tenant, that the external key management system has performed an operation on the header encryption key; and
in response to determining that the external key management system has performed the operation on the header encryption key, modifying, by the local secure storage tenant, operation of the database system.

11. The system of claim 10, wherein the database system determines that the external key management system has performed the operation on the header encryption key in response to periodic querying of the external key management system for changes to the header encryption key.

12. The system of claim 10, wherein the operation on the header encryption key comprises a new version of the header encryption key or updated properties of the header encryption key and modifying the operation of the database system comprises updating the header encryption key to reflect the new version or the updated properties.

13. The system of claim 10, wherein the operation on the header encryption key comprises a disabling of the header encryption key and modifying the operation of the database system comprises disabling the database system by denying access to the header encryption key.

14. A computer program product encoded on a non-transitory storage medium, the product comprising non-transitory, computer readable instructions for causing one or more processors to perform operations comprising:
sending, by a local secure storage tenant of a database system, a request to an external key management system external to the database system for a header encryption key, where the header encryption key is used to encrypt a header of a payload database that includes a key encryption key that is used to encrypt and decrypt a data encryption key used by a database tenant of the database system, wherein the database tenant is separate from the local secure storage tenant;
receiving, by the local secure storage tenant, the header encryption key from the external key management system;
using, by the local secure storage tenant, the header encryption key to decrypt the header of the payload database to obtain the key encryption key;
receiving a request at the local secure storage tenant, from the database tenant, for the data encryption key;
obtaining, by the local secure storage tenant, the data encryption key using the key encryption key;
providing, by the local secure storage tenant, the data encryption key to the database tenant;
decrypting, by the database tenant and using the data encryption key, encrypted database data to obtain decrypted database data before performing an operation on the decrypted database data;
determining, by the local secure storage tenant, that the external key management system has performed an operation on the header encryption key; and
in response to determining that the external key management system has performed the operation on the header encryption key, modifying, by the local secure storage tenant, operation of the database system.

15. The computer program product of claim 14, wherein the database system determines that the external key management system has performed the operation on the header encryption key in response to periodic querying of the external key management system for changes to the header encryption key.

16. The computer program product of claim 14, wherein the operation on the header encryption key comprises a new version of the header encryption key or updated properties of the header encryption key and modifying the operation of the database system comprises updating the header encryption key to reflect the new version or the updated properties.

17. The computer program product of claim 14, wherein the operation on the header encryption key comprises a disabling of the header encryption key and modifying the operation of the database system comprises disabling the database system by denying access to the header encryption key.

* * * * *